(12) United States Patent
Benedick

(10) Patent No.: US 12,181,589 B2
(45) Date of Patent: Dec. 31, 2024

(54) MANIPULATING THE OPTICAL PHASE OF A LASER BEAM

(71) Applicant: Massachusetts Institute of Technology, Cambridge, MA (US)

(72) Inventor: Andrew Benedick, Stow, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 326 days.

(21) Appl. No.: 17/817,859

(22) Filed: Aug. 5, 2022

(65) Prior Publication Data

US 2023/0105656 A1 Apr. 6, 2023

Related U.S. Application Data

(60) Provisional application No. 63/252,389, filed on Oct. 5, 2021.

(51) Int. Cl.
  *G01S 19/44* (2010.01)
  *G01S 19/04* (2010.01)
  *G01S 19/46* (2010.01)
(52) U.S. Cl.
  CPC .............. *G01S 19/44* (2013.01); *G01S 19/04* (2013.01); *G01S 19/46* (2013.01)
(58) Field of Classification Search
  None
  See application file for complete search history.

(56) References Cited

U.S. PATENT DOCUMENTS

| 7,065,110 B2 | 6/2006 | Rice et al. |
| 11,409,032 B2 * | 8/2022 | Goodno ............. G02B 6/03694 |

(Continued)

OTHER PUBLICATIONS

Ahmadi et al., "Generating kW laser light at 532 nm via second harmonic generation of a high power Yb-doped fiber amplifier." Nonlinear Frequency Generation and Conversion: Materials and Devices XIX. vol. 11264. International Society for Optics and Photonics, 2020. 7 pages.

(Continued)

*Primary Examiner* — Bernarr E Gregory
(74) *Attorney, Agent, or Firm* — Smith Baluch LLP

(57) ABSTRACT

Binary-phase-shift-key, phase-modulated waveforms with gigahertz bandwidths, suitable for kilowatt-class fiber amplifiers, can be narrowed back to the source laser's linewidth via second-harmonic, sum-frequency, or difference-frequency generation in a second-order nonlinear crystal. The spectrum of an optical signal phase-modulated with a pseudo-random bit sequence (PRBS) waveform recovers its original optical spectrum when frequency-doubled using second-harmonic generation (SHG). Conceptually, the PRBS waveform is cancelled by the SHG process, and the underlying laser spectrum is converted to the second-harmonic wavelength as though the PRBS modulation were not present. The same cancellation is possible with sum-frequency generation (SFG) and difference frequency generation (DFG), making it possible to construct high-power, narrow-linewidth lasers at wavelengths from the visible to the long-wave infrared. Using ytterbium-, erbium-, thulium-, and neodymium-doped fibers with SHG, SFG and DFG processes allows generation of high-power beams with very narrowband optical spectra and wavelengths from below 400 nm to beyond 5 μm.

20 Claims, 8 Drawing Sheets

(56) References Cited

U.S. PATENT DOCUMENTS

| | | | |
|---|---|---|---|
| 11,831,123 B2* | 11/2023 | Langseth | ............. H01S 3/2383 |
| 2005/0169326 A1 | 8/2005 | Jacob et al. | |
| 2014/0016655 A1* | 1/2014 | Armstrong | ......... H01S 3/06754 |
| | | | 372/6 |
| 2014/0086267 A1* | 3/2014 | Dennis | ................ H01S 3/06754 |
| | | | 359/279 |
| 2015/0139255 A1* | 5/2015 | Armstrong | ......... H01S 3/06754 |
| | | | 372/6 |
| 2018/0269645 A1* | 9/2018 | Cannon | ................ H01S 3/2308 |
| 2020/0328423 A1 | 10/2020 | Li et al. | |

OTHER PUBLICATIONS

Beier, et al. "Single mode 4.3 kW output power from a diode-pumped Yb-fiber amplifier", Optics Express 25.13 (2017): 14892-14899.

Benedick "Method for Building kW-class Lasers with kHz-class Linewidths," CLEO: Science and Innovations. Optica Publishing Group, 2022, 2 pages.

Chen et al. "Li metal deposition and stripping in a solid-state battery via Coble creep." Nature 578.7794 (2020): 251-255.

Davies et al., "RF phase sensitive amplifier with 70 dB phase sensitive dynamic range." Optics Communications 433 (2019): 115-119.

Dixneuf et al., "Ultra-low intensity noise, all fiber 365 W linearly polarized single frequency laser at 1064 nm", Optics Express 28.8 (2020): 10960-10969.

Flores et al., "Pseudo-Random binary sequence phase modulation for narrow linewidth, kilowatt, monolithic fiber amplifiers", Optics Express 22.15 (2014): 17735-17744.

Fu et al. "Toward garnet electrolyte-based Li metal batteries: an ultrathin, highly effective, artificial solid-state electrolyte/metallic Li interface. Sci. Adv. 3, e1601659 (2017)." (2017): 59. (12 pages).

Han et al. "Negating interfacial impedance in garnet-based solid-state Li metal batteries." Nature Materials 16.5 (2017): 572-579.

Jones et al., "Phase regeneration of an M-PSK signal using partial regeneration of its M/2-PSK second phase harmonic." Optics Communications 334 (2015): 35-40.

Li et al. "Mastering the interface for advanced all-solid-state lithium rechargeable batteries." Proceedings of the National Academy of Sciences 113.47 (2016): 13313-13317.

Liu et al. "Transforming from planar to three-dimensional lithium with flowable interphase for solid lithium metal batteries." Science Advances 3.10 (2017): eaao0713, 11 pages.

Luo et al. "Transition from superlithiophobicity to superlithiophilicity of garnet solid-state electrolyte." Journal of the American Chemical Society 138.37 (2016): 12258-12262.

Sharafi et al. "Surface chemistry mechanism of ultra-low interfacial resistance in the solid-state electrolyte $Li_7La_3Zr_2O_{12}$." Chemistry of Materials 29.18 (2017): 7961-7968.

Umeki et al., "In-line phase sensitive amplifier based on PPLN waveguides." Optics Express 21.10 (2013): 12077-12084.

Wang et al. "Conformal, nanoscale ZnO surface modification of garnet-based solid-state electrolyte for lithium metal anodes." Nano Letters 17.1 (2017): 565-571.

Wenchang et al., "550 W single frequency fiber amplifier emitting at 1030 nm based on a tapered Yb-doped fiber." Optics Express 28.14 (2020): 20908-20919.

Yang et al. "Continuous plating/stripping behavior of solid-state lithium metal anode in a 3D ion-conductive framework." Proceedings of the National Academy of Sciences 115.15 (2018): 3770-3775.

Zeng et al., "Spectral compression by phase doubling in second harmonic generation," Optics Letters, Jan. 15, 2022, vol. 47, No. 2, pp. 222-225.

* cited by examiner

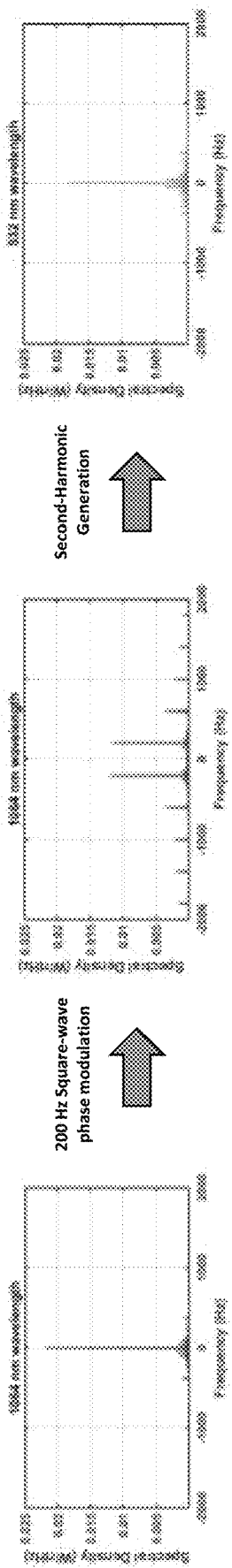

MANIPULATING THE OPTICAL PHASE OF A LASER BEAM

CROSS-REFERENCE TO RELATED APPLICATION(S)

This application claims the priority benefit, under 35 U.S.C. 119 (e), of U.S. Application No. 63/252,389, filed on Oct. 5, 2021, which is incorporated by reference in its entirety for all purposes.

GOVERNMENT SUPPORT

This invention was made with government support under FA8702-15-D-0001 awarded by the U.S. Air Force. The government has certain rights in the invention.

BACKGROUND

Narrow linewidth lasers (e.g., <100 kHz linewidth) are used for applications ranging from remote sensing, coherent communications, coherent lidar, laser guide stars, and atomic physics applications. Several effects tend to work against building high-power narrow-linewidth lasers, including gain inhomogeneity, inadequate side-mode suppression or loss, spatial-hole burning, stimulated Brillouin scattering (SBS) in the case of fiber amplifiers, and multiple spatial modes and facet damage in the case of diode lasers.

The single-frequency output power of narrow-linewidth, Yb-doped fiber amplifiers can be scaled to over 500 W. Output powers above a kilowatt are also regularly reported in fiber amplifiers with optical bandwidths of up to tens of GHz to suppress SBS. In many of these fiber amplifiers, the linewidth of the seed beam is broadened to reduce the deleterious effects of SBS.

SUMMARY

The present technology allows generation of laser beams which can have all desirable properties simultaneously. Using the present technology, lasers with very narrow linewidth (e.g., <<10 kHz), arbitrary optical power (e.g., up to and beyond 1 kW), good beam quality (e.g., $M^2$<1.1), linear polarization (e.g., >18 dB), good electrical-to-optical efficiency (e.g., up to 20%), modest physical size (e.g., <<1 $m^3$) and at any of a wide range of wavelengths (e.g., 100 nm to 20 um) can be realized. For example, a >2 kW fiber amplifier, lithium triborate crystal (LBO), and fiber-coupled phase modulator can generate a 1 kW beam at 532 nm with a <1 kHz linewidth. The present technology can be carried out as follows. Start with one or two narrowband laser sources, or seed lasers; when using two seed lasers, the seed lasers may emit light at different wavelengths. Apply identical phase modulation to the seed beam(s) (also called seed laser beam(s)), then pass the phase-modulated light through a material with a $\chi^{(2)}$ second-order nonlinearity.

The output of the $\chi^{(2)}$ material is at the sum of or difference between the frequencies of the input beams with phase modulation that is the sum of the phase modulation applied to each seed beam. If the phase modulation applied to the seed beam(s) is binary phase modulation that toggles between 0 and $\pi$, then the output phase modulation will toggle between 0 and $2\pi$. Because 0 and $2\pi$ are equivalent phases, the second-order nonlinear process in the $\chi^{(2)}$ material effectively cancels the binary phase modulation applied to the input beams.

When using only one seed laser, narrowing of the broadened spectrum occurs through second-harmonic generation (SHG). With two seed lasers, narrowing occurs through sum-frequency generation (SFG) or difference-frequency generation (DFG). In all cases, the full output power capability of the fiber amplifier(s) is available at the output of the $\chi^{(2)}$ material, limited only by the normal rules for conversion efficiency in the $\chi^{(2)}$ material.

This technique can also be implemented by modulating the phase of a seed beam at a first wavelength (e.g., from 970 nm to 2100 nm or from 1000 nm to 1100 nm) with a phase modulation (e.g., a PRBS) alternating between phase shifts of 0 and $\pi$, amplifying the seed beam with a fiber amplifier, and interacting the seed beam with a nonlinear medium to generate an output beam at a second wavelength (e.g., from 485 nm to 1050 nm or from 500 nm to 550 nm) different than the first wavelength and without any phase modulation. Amplifying the seed beam with the fiber amplifier can comprise boosting the seed beam's power level to at least 1 kW. Interacting the seed beam with the nonlinear medium may include generating the output beam as a second harmonic of the seed beam.

In some cases, the seed beam is a first seed beam and the fiber amplifier is a first fiber amplifier. These cases may include modulating a phase of a second seed beam with the same phase modulation (aligned with the phase modulation of the first seed beam) and amplifying the second seed beam with the second fiber amplifier. In these cases, interacting the first seed beam with the nonlinear medium comprises interacting the first seed beam and the second seed beam in the nonlinear medium. This produces an output beam at a carrier frequency equal to a sum of a carrier frequency of the first seed beam and a carrier frequency of the second seed beam or at a carrier frequency equal to a difference of a carrier frequency of the first seed beam and a carrier frequency of the second seed beam.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 4:
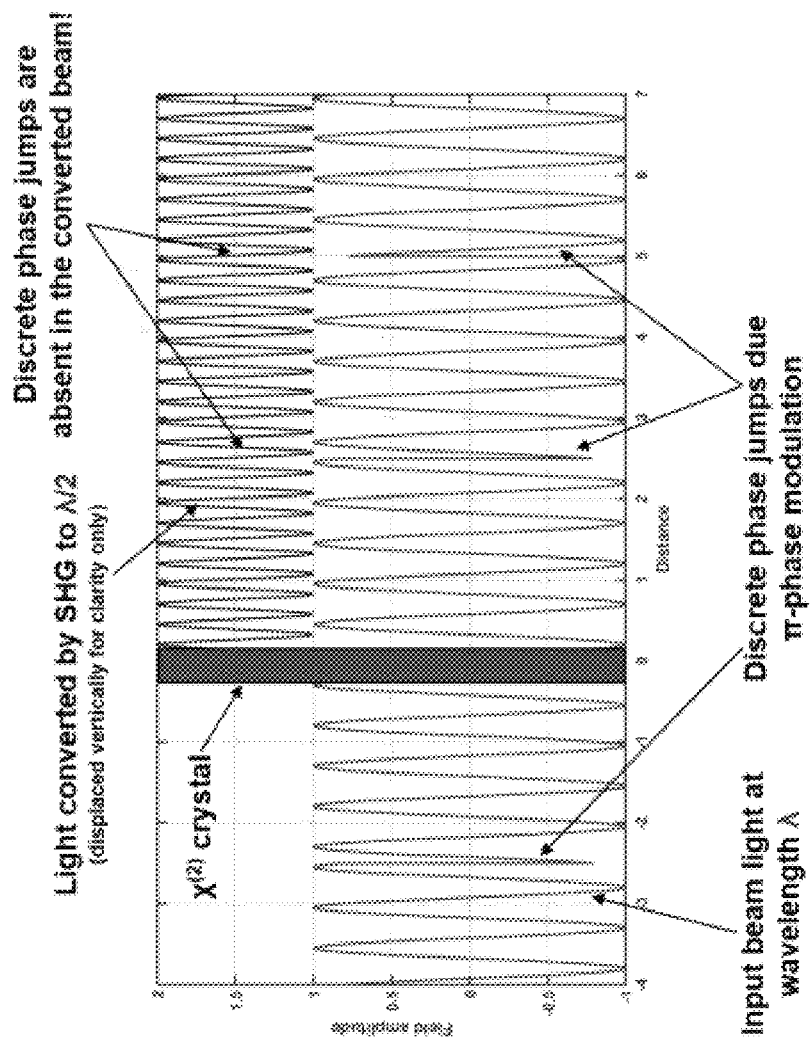

FIG. 4 is a detailed view of the optical phase of a BPSK phase-modulated laser beam before and after second-harmonic generation in a $\chi^{(2)}$ crystal. Discrete $\pi$ phase shifts are visible in the input beam (left) before entering the $\chi^{(2)}$ crystal and after exiting in the unconverted portion of the input beam on the right side of the $\chi^{(2)}$ crystal. The output second harmonic beam (upper right) does not have the same $\pi$ phase shifts because of the squaring process applied by the $\chi^{(2)}$ crystal and the amplitudes of the phase shifts.

Figures 5A, 5B:
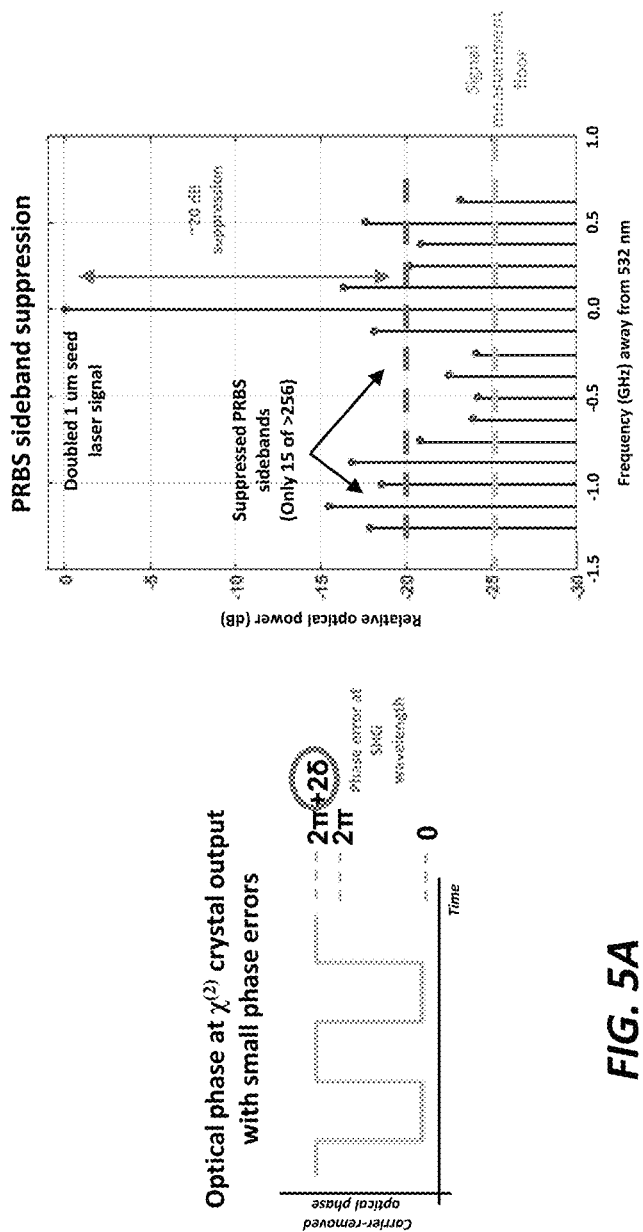

FIG. 5A is a plot of the phase envelope of the optical carrier of a second-harmonic beam with small phase errors due to small phase errors in the PRBS used to phase-modulate the seed beam used to generate the second-harmonic beam.

FIG. 5B is plot of the measured spectrum of the second-harmonic beam showing suppression of PRBS sidebands.

Figure 5D:
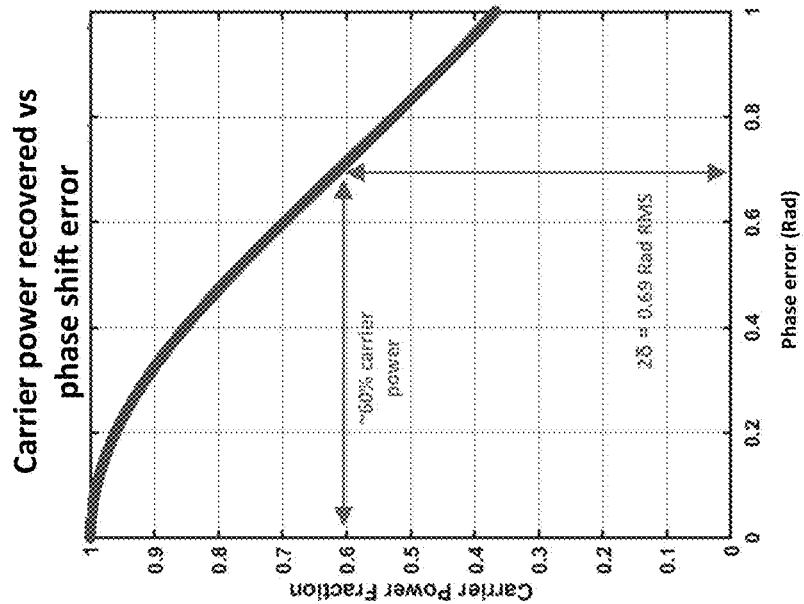
Figure 5C:
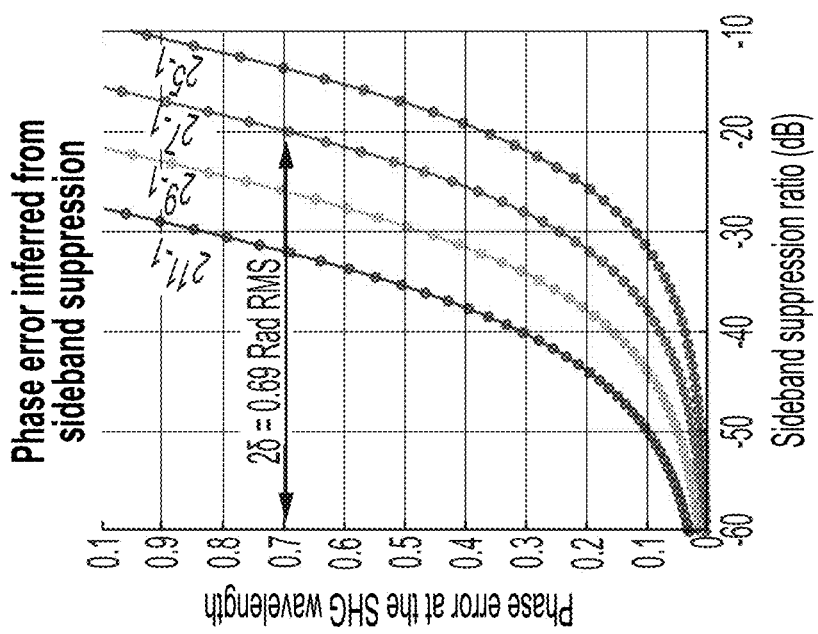

FIG. 5C is a plot of the measured phase error at the second-harmonic wavelength versus the sideband suppression ratio.

FIG. 5D is a plot of the recovered optical carrier power versus phase error in the PRBS used to modulate the seed beam.

Figure 6:
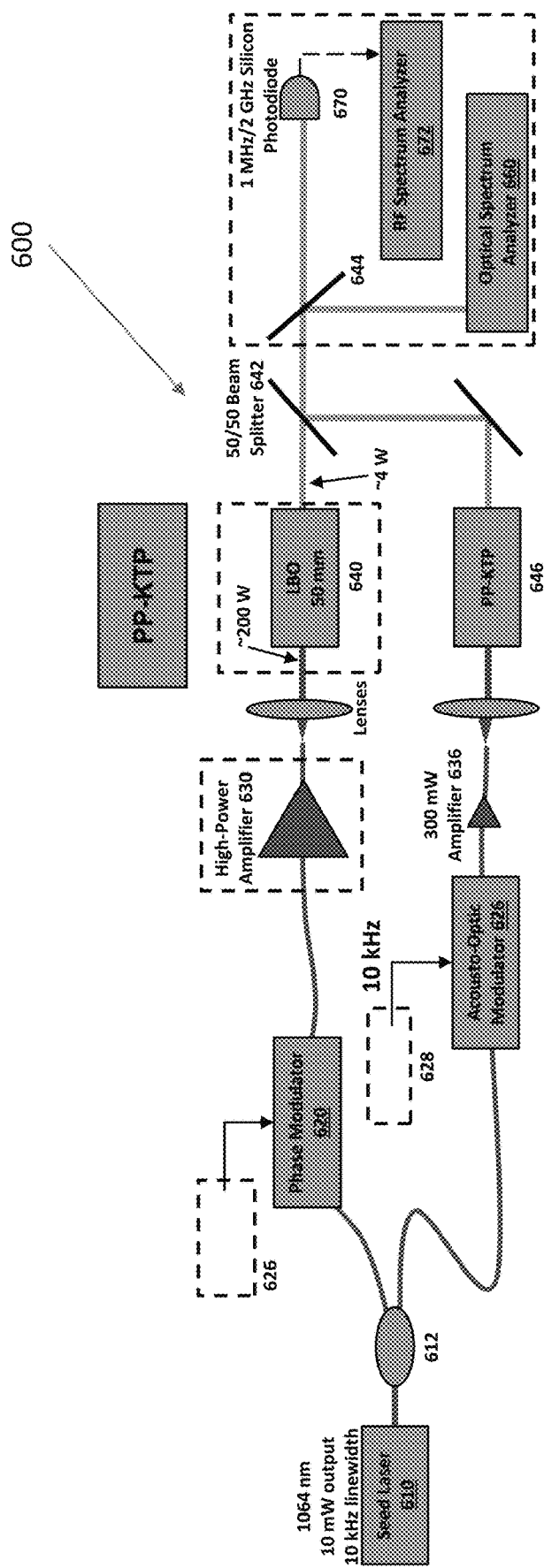

FIG. 6 illustrates a Mach-Zehnder interferometer for measuring the linewidth of a narrow-linewidth visible beam produced using second-harmonic generation in one arm with a frequency-shifted visible beam produced using second-harmonic generation in the other arm.

FIG. 7A is a plot of the spectrum of the output of the seed laser shown in FIG. 6 measured using a heterodyne technique.

FIG. 7B is a plot of the spectrum of the output of the seed laser shown in FIG. 6 phase-modulated with a 200 Hz square wave that toggles between 0 and $\pi$.

FIG. 7C is a plot of the spectrum of the second harmonic of the phase-modulated seed beam of FIG. 7B showing no phase modulation.

FIG. 8A is a plot of the spectrum of the output of the seed laser shown in FIG. 6 measured using an optical spectrum analyzer.

FIG. 8B is a plot of the spectrum of the output of the seed laser shown in FIG. 6 phase-modulated with a 16 Gbps pseudo-random bit sequence (PRBS) that toggles between 0 and $\pi$.

FIG. 8C is a plot of the spectrum of the second-harmonic of the phase-modulated seed beam of FIG. 8B showing no phase modulation.

DETAILED DESCRIPTION

The present technology enables the use of high-power fiber lasers as seed lasers for generating high-power, narrowband visible beams through frequency doubling or sum-frequency generation and infrared beam through difference-frequency generation. Today, most high-power, visible lasers are optically pumped semiconductor lasers that can produce at most about 20 W at linewidths of 5 MHz or more. Fiber lasers can emit light with bandwidths in the tens of GHz range at kilowatt power levels, but typically operate at center wavelengths from about 1000 nm to about 1100 nm instead of in the visible portion of the electromagnetic spectrum.

A fiber laser's maximum power is usually limited by stimulated Brillouin scattering (SBS) and other nonlinear effects in the fiber and in the fiber amplifiers that boost the beam power. These effects can be mitigated by broadening the linewidth of the seed beam, e.g., with a pseudo random binary sequence (PRBS) where zeros and ones are represented by phase shifts of 0 and $\pi$, respectively. With PRBS modulation, the fiber laser's output can reach several kilowatts, which can be frequency-doubled in a nonlinear crystal at an efficiency of over 50% to produce a narrowband visible beam at a power level of a kilowatt or more without any phase modulation. For example, a >2 kW fiber amplifier, lithium triborate crystal (LBO), and fiber-coupled phase modulator applying a PRBS pattern with 0-$\pi$ phase shifts can generate a 1 kW beam at 532 nm with a <1 kHz linewidth, where frequency doubling in the LBO eliminates PRBS phase modulation imparted on the fiber laser seed beam by the fiber-coupled phase modulator.

Many application areas benefit from very narrowband, high-power, visible laser sources, including lithography, laser guide stars, atomic physics experiments (e.g., LIGO, LISA, or cold atom research), pump sources for optical parametric oscillators (OPOs), Doppler-wind lidar, and free-space coherent communications, among others. In each of these applications areas, the benefits include reduced cost of ownership, with both capital and running costs that are lower through higher laser efficiency, and higher system performance thanks to the greatly increased amount of laser power available for each application. Greatly reduced laser source construction and operational complexity along with smaller physical size are also huge benefits, along with improved laser system reliability. In some cases, the projected increases in performance (increased power and linewidth reduction) are large enough to apply savings in multiple dimensions at once.

In addition to generating narrow-linewidth, high-power, visible laser beams, the technology disclosed here can be used to manipulate the phase of laser light and exploits the phase relationship between the phase of the input waves (summation) and the desired output wave. This phase relationship can be exploited to create a constant output phase for a narrow-linewidth laser beam. Other applications (e.g., communications) may involve a more complex phase at the output; both are possible with this technique.

In an optical communications system, the disclosed technique could be used to enable access to a new wavelength region. Operating the communication system at this new wavelength would be advantageous for several reasons, including reduced diffraction (operation at short visible wavelengths) to reduce either transmit or receive aperture size or transmit power, or reduced scattering (operation at longer IR wavelengths), which would also reduce transmit power requirements. In both cases, modulators and laser sources of adequate optical power are not necessarily available.

The disclosed technique(s) could enable access to these alternative wavelength regions in two ways. First, they could ensure availability of adequate phase or amplitude modulation equipment. The most high-performance optical modulation equipment currently exists for operation near 1.55 μm (typically Er: fiber laser systems) or 1 μm (typically 1 μm Yb: fiber systems). Second, both the Er and Yb sources are capable of at least 100 W of output power, which after conversion using an enhancement cavity would enable >50

W of optical power, more than enough for almost any type of communication system. While the modulation used for coding information is sometimes adequate to suppress non-linearities in the fiber amplifier, using the disclosed technique with the configuration described below would enable access to the full output power available from the amplifier system independent of the data being transmitted without imposing any additional complexities on the receiver.

Figure 2:
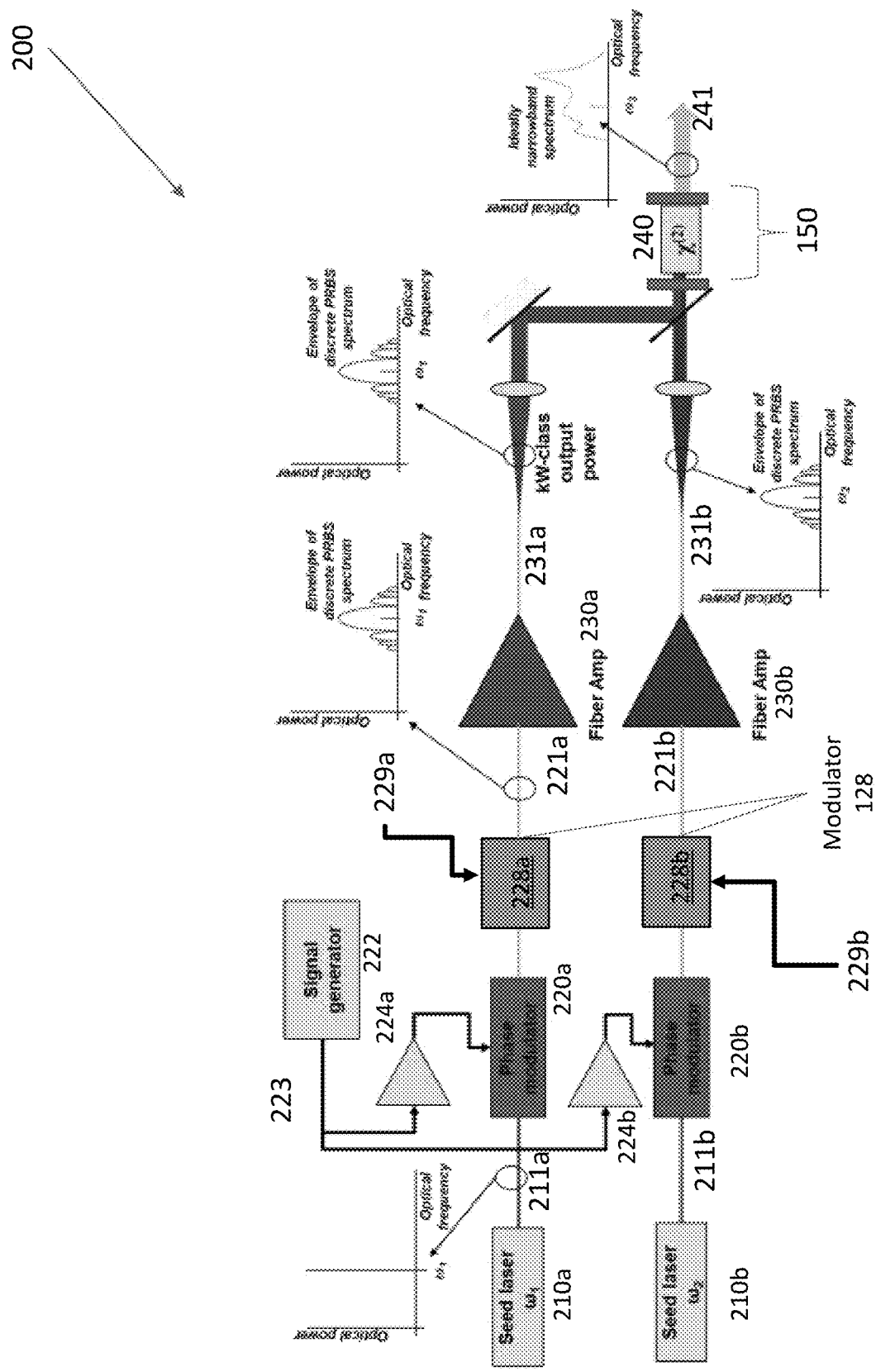
FIG. 2 shows a system for generating high-power visible beams with narrow linewidths from phase-modulated beams at different wavelengths using sum- or difference-frequency generation in a $\chi^{(2)}$ crystal.

An embodiment of such a system could include a Yb or Er fiber amplifier fed by a narrow-bandwidth seed laser modulated for both communication and suppression of optical nonlinearities, namely SBS. FIG. 2 (described in greater detail below) is an excellent example of such system, where the communication signals are applied in addition to the phase modulation signals at 220a and 220b or at amplitude modulators in optical communication with same. The output of the fiber amplifier is fed to a crystal with a second-order nonlinearity, along with the output of another wavelength source for the output of the crystal to occur at the desired wavelength. With judicious choice of modulation patterns applied to each seed beam, the signal passing through the fiber amplifiers can suppress SBS and allow full amplifier output power, leaving only the desired modulation signal at the output of the second-order nonlinear crystal. Put differently, the output of the second-order nonlinear crystal does not include any extraneous modulation that could otherwise complicate the receiver detection of decoding system.

One very simple modulation method would modulate any beams amplified in the fiber amplifiers with PRBS patterns with 0-$\pi$ drive amplitudes. This suppresses SBS, and the output of the nonlinear crystal is narrowband. Additionally modulating one of the beams with the communication signal (amplitude modulation or phase modulation at either the Yb or Er wavelength, for example), would then appear at the output of the nonlinear crystal for ready detection by a standard receiver topology. Amplitude modulation can be realized with a Mach-Zehnder modulator or other suitable device. Phase modulation using a SHG scheme can be realized using the communication modulator to apply a $\pi/2$ phase shift to ensure a $\pi$ phase shift at the receiver, or more generally half the desired modulation at the receiver. A system utilizing SFG or DFG to access the desired wavelength would simply apply the communication signal directly in the desired phase modulation format with no complimentary signal on the second beam, ensuring no cancellation of the communication signal. More complex configurations are possible directly from this simple example.

Many other applications are served with the configuration described above and in FIG. 2. Coherent range detection using either BPSK waveforms or frequency chirps are directly realized using the same rules described above for SHG or SFG and DFG realizations.

High-Power Narrow-Linewidth Laser Via Second Harmonic Generation

Figure 1:
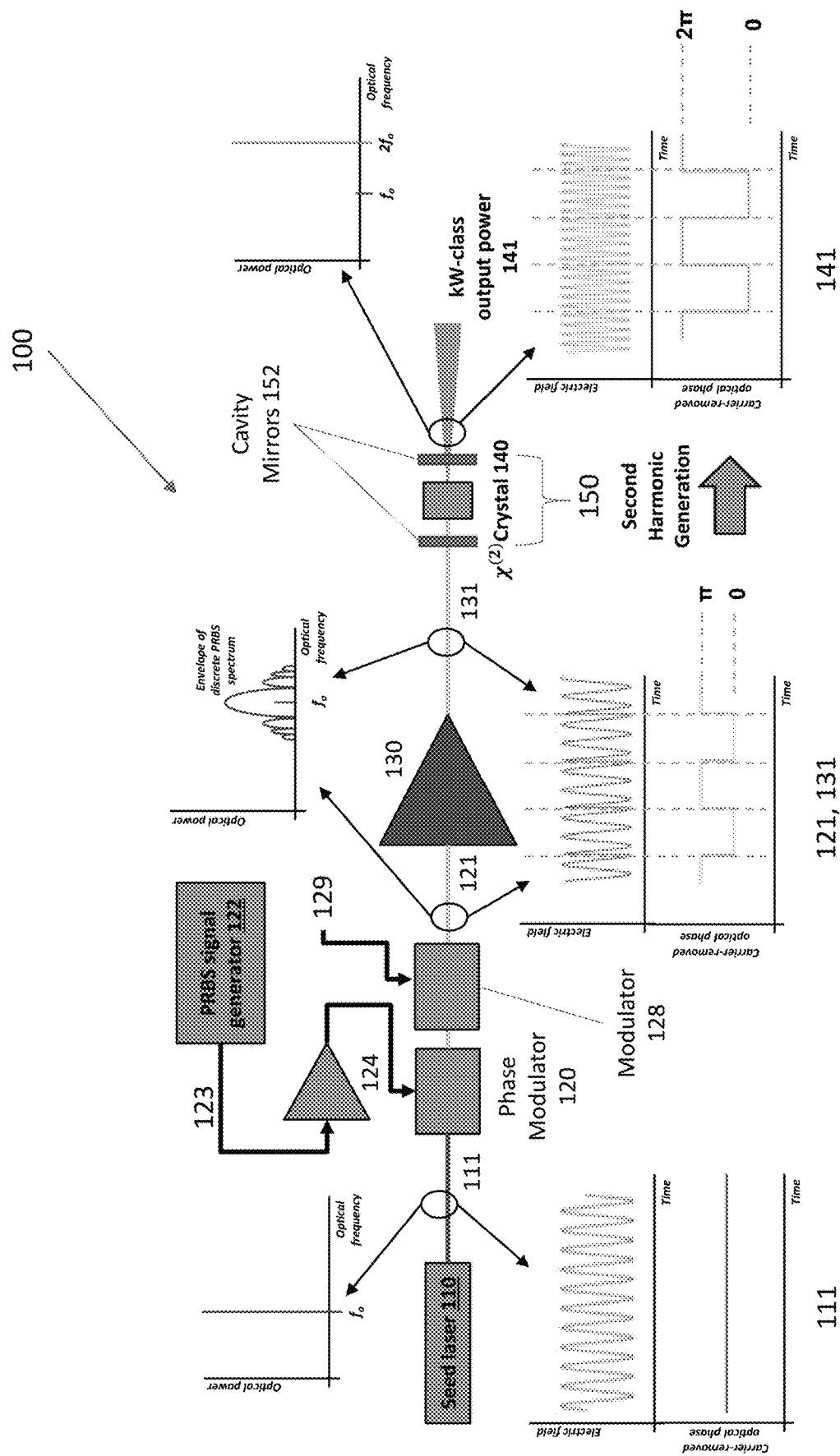
FIG. 1 shows a system for generating a high-power visible beam with a narrow linewidth using binary phase-shift-keyed (BPSK) modulation, where the binary 0's and 1's are represented as 0 and $\pi$ phase shifts, respectively, and second-harmonic generation in a $\chi^{(2)}$ crystal.

FIG. 1 shows a system 100 for generating a high-power, narrow-linewidth laser beam 141 using second-harmonic generation of a continuous-wave, narrow-linewidth seed beam 111 phase-modulated with a PRBS that alternates between 0 and $\pi$. The system 100 includes a narrow-linewidth seed laser 110, phase modulator 120, optical amplifier 130, and second-order nonlinear medium 140, also called a $\chi^{(2)}$ medium or nonlinear medium (these media are often crystals). In operation, the narrow-linewidth seed laser 110, which may be a fiber laser, Nd:YAG laser, or other source with suitable output power and linewidth, emits a narrowband seed beam 111 at a wavelength that is twice the desired wavelength of the output beam 141. For example, the seed beam 111 may be at a wavelength of 1000-1100 nm (e.g., 1064 nm), which implies an output beam wavelength of 500-550 nm (e.g., 532 nm). In this example, the seed beam 111 is a continuous-wave (CW) beam with a sinusoidal carrier frequency and no phase modulation as shown at lower left in FIG. 1. In other examples, the seed beam can be pulsed.

The phase modulator 120 (e.g., an electro-optic phase modulator) modulates the phase of the seed beam 111 with a PRBS, square wave, or other binary-phase-shift-key (BPSK) phase-modulation waveform 123, which can have a modulation rate between 0 and several 10 s of Gbps, that alternates between phase shifts of 0 and $\pi 0$ (unless indicated otherwise, the phase shifts are in radians). A radio-frequency (RF) signal generator 122, arbitrary waveform generator (AWG), or other suitable signal source can be used to create the RF waveform 123 and usually at an amplitude lower than that required to drive the phase modulator 120 from 0-$\pi$. The RF waveform 123 can be of any suitable bandwidth and is especially useful for suppressing SBS if its bandwidth is greater than the SBS bandwidth, which is often about 100 MHz. More specifically, the RF waveform's bandwidth may be 100 MHZ, 250 MHZ, 500 MHZ, 1 GHZ, 2.5 GHZ, 5 GHZ, 10 GHZ, etc., up the maximum bandwidth of the phase modulator 120.

An optional RF amplifier 124 coupled between the RF signal generator 122 and phase modulator 120 boosts the amplitude of the BPSK phase-modulation waveform 123 to the desired 0-$\pi$ modulation amplitude. The phase modulator 120 emits a phase-modulated seed beam 121 whose optical carrier has abrupt phase transitions and a sinc-like spectrum envelope corresponding to the 0/$\pi$ phase shifts in the phase-modulator waveform as shown in the plots at the center top and bottom of FIG. 1.

The system 100 in FIG. 1 also includes an optional modulator 128 that can be used to modulate a communications signal 129 onto the phase-modulated seed beam 121. This optional modulator 128 can be an amplitude or phase modulator. If the communications signal 129 is a phase-only signal, then it can be added to the phase modulation 123 modulated onto the seed beam 111 by the phase modulator 120 as described above. So long as the communications signal 129 is not a binary 0-$\pi$ phase signal, it will also appear on the frequency-converted output of the $\chi^{(2)}$ medium 140 with twice the modulation amplitude. For example, if the communications signal 129 is a binary 0-$\pi/2$ phase signal, it will appear on the second-harmonic signal as binary 0-$\pi$ modulation.

The optical amplifier 130, which may be a high-power fiber amplifier, increases the amplitude of the phase-modulated seed beam 121 to produce an amplified, phase-modulated seed beam 131. The gain of the optical amplifier 130 and amplitude of the amplified, phase-modulated seed beam 131 depend on the application; for high-power applications, the gain and amplitude of these possibly multi-stage optical amplifiers may be 30 dB to 60 dB and 300 mW to 10 KW (e.g., 300 mW, 3 W, 30 W, 300 W, 1 KW, or 3 KW), respectively.

The amplified, phase-modulated seed beam 131 is coupled into the $\chi^{(2)}$ medium 140, which may be a bulk $\chi^{(2)}$ crystal or a fiber doped with $\chi^{(2)}$ material, via an optical fiber, such as a small-core, single-mode optical fiber or a larger-core, few-moded optical fiber. Suitable $\chi^{(2)}$ materials include, but are not limited to, lithium triborate (LBO), potassium titanyl phosphate (KTP), monopotassium phosphate (KDP), lithium iodate (LiIO$_3$), potassium niobate (KNbO$_3$), β-barium borate (BBO), gallium selenide (GaSe), and lithium niobate (LiNbO$_3$). The materials listed here are generally appropriate for high-average power continuous-wave lasers, but other materials such as gasses or liquids may be more appropriate for pulsed laser sources, so long as they have a $\chi^{(2)}$ response. The amplified, phase-modulated seed beam 131 undergoes a $\chi^{(2)}$ second-order nonlinear process—specifically, second-harmonic generation (SHG)—in the $\chi^{(2)}$ material 140, which emits the result of that $\chi^{(2)}$ second-order nonlinear process—the second-harmonic beam 141—as well as any unconverted portion of the amplified, phase-modulated seed beam 131. The $\chi^{(2)}$ second-order nonlinear process, also called a $\chi^{(2)}$ process or a second-order nonlinear process, effectively "cancels" the BPSK phase modulation from the second-harmonic beam 141 by doubling the π phase shifts to 2π phase shifts, leaving the second-harmonic beam 141 with sinusoidal carrier and narrow linewidth as shown in the plots at right in FIG. 1.

When undergoing a $\chi^{(2)}$ process, the phase of the waves that drive the process are added together. In the case of SHG, as in FIG. 1, the waves that drive the $\chi^{(2)}$ process are degenerate and can be treated as a single wave whose phase is doubled. If this wave has a discrete 0-π phase shift added via phase modulation, that phase shift is transformed to a 0-2π phase shift during SHG, essentially cancelling the phase modulation. The resulting optical spectrum can be predicted using standard tools for analyzing SHG. The cancellation efficiency of the phase modulation is related to the deviation of the phase modulation waveform from the ideal of a perfectly square 0-π transition, and how precisely the phase modulation reaches both π and 0. A 3% deviation from π yields a 1% loss of power from the carrier to the sidebands, akin to low-amplitude phase modulation of the SHG signal. In the case of sum-frequency generation (SFG) or difference-frequency generation (DFG), which are $\chi^{(2)}$ processes that use two non-degenerate beams, the phase modulation applied to the non-degenerate beams should be aligned in time (temporally) as explained below to reduce or avoid phase errors.

If desired, the $\chi^{(2)}$ medium 140 can be positioned within an enhancement cavity 150 formed by a pair of cavity mirrors 152 on opposite sides of the $\chi^{(2)}$ medium 140 to increase the SHG conversion efficiency. The system 100 can operate at relatively high SHG conversion efficiency without an enhancement cavity if adequate CW optical power is applied to the $\chi^{(2)}$ medium 140. To use an enhancement cavity with this technique, the temporal length of the PRBS, or more generally BPSK, pattern applied to the seed beam should have a time duration equal to the round-trip time in the cavity. Meeting this criterion ensures that when the beginning of the repeated pattern is incident on one of the cavity mirrors 152 for coupling into the cavity 150, the field circulating inside the cavity 150 incident on the opposite side of the same mirror 152 has the same modulation pattern. The two fields will then add constructively throughout the full duration of the pattern. Alternatively, the cavity 150 can be constructed such that one round trip for the field in the cavity 150 requires an integer number greater than 1 (2, 3, 4 . . . . N) times the duration of the repeating modulation pattern (the cavity 150 is N times longer). Said another way, there can be one, two, three, or N copies of the pattern circulating in the cavity 150 and still meet the criterion for constructive addition of successive patterns. Further, the precision with which the time duration of the pattern and the round-trip time of the cavity should be matched is related to the finesse of the optical cavity. In essence, if a photon will generally survive for 100 round trips in the cavity (roughly equal to a finesse of 100), then the cavity round trip time and the phase modulation pattern duration should be matched to 1 part in 100 to maintain both good conversion efficiency provided by the cavity and the optical properties conferred by the disclosed technique.

If the amplitude of the amplified, phase-modulated seed beam 131 is high enough, as is available from kW-class fiber amplifiers, the SHG conversion efficiency can be as high as 54% in a system without an enhancement cavity.

As described above, many other modulation formats can be included with the base π-phase modulation, without loss of the ability to cancel the x-phase modulation.

High-Power Narrow-Linewidth Laser via Sum and Difference Frequency Generation

FIG. 2 shows a system 200 that can be used to generate a narrow-linewidth beam 241 using suitable phase modulation (e.g., binary 0/π phase modulation) and SHG, SFG, or DFG in a $\chi^{(2)}$ nonlinear crystal 240. This system 200 includes two narrowband seed lasers 210a and 210b, phase modulators 220a and 220b for applying a PRBS or other binary 0/π phase modulation 223, high-power fiber amplifiers 230a and 230b that operate on spectrally broadened seed beams, and the $\chi^{(2)}$ nonlinear crystal 240 (e.g., LBO). This system 200 can perform SHG using one the laser 210 at a time, SFG using both lasers 210, or DFG also using both lasers 210. (SHG can be thought of as SFG with a pair of degenerate beams emitted by the same seed laser.) Because the phase modulation 223 is 0/π phase modulation, the $\chi^{(2)}$ process effectively cancels the phase modulation in the converted beam 241.

In FIG. 2, the seed lasers 210a and 210b generate CW or pulsed narrowband seed beams 211a and 211b at carrier frequencies of @1 and @2, respectively, which may be at wavelengths between about 1000 nm and 1100 nm. The phase modulators 220a and 220b modulate the optical phases of the seed beams 211a and 211b by applying the phase modulation 223, which can be a PRBS or other BPSK waveform realized as 0 and π phase shifts, to produce phase-modulated seed beams 221a and 221b. Again, the phase modulation 223 may have a bandwidth of 100 MHz or more (e.g., 1 GHZ, 5 GHZ, 10 GHZ, etc.) to suppress SBS. As described above, many other additional modulation formats are possible, while keeping the ability to suppress the underlying π-phase modulation.

FIG. 2 also shows optional modulators 228a and 228b that modulate respective communications waveforms 229a and 229b onto the phase-modulated seed beams 221a and 221b. These optical modulators 228a and 228b can be amplitude modulators or additional phase modulators. The communications waveforms 229a and 229c can be the same or different; in either case, the modulated seed beams will add or subtract in accordance with the SFG or DFG performed in the nonlinear crystal 240. In this example, both seed beams 221a and 221b are modulated with communications waveforms 229a and 229b, but the output beam 241 will be modulated with a communications signal even if only one seed beam is modulated with a communications waveform. Alternatively, the optional modulators can be omitted, and the communications waveforms 229a and 229b can be added to the phase modulation 223 and resulting waveform phase-modulated onto the seed beams 221a and 221b with the phase modulators 220a and 220b.

The phase modulation 223 is generated by a signal generator 222 and amplified in the electronic domain by a pair of amplifiers 224a and 224b. These phase-modulation waveforms broaden the spectra of the seed beams so that they can be amplified to higher power levels by the fiber amplifiers 230a and 230b. The resulting phase-modulated, amplified beams 231a and 231b are then coupled into the nonlinear crystal 240, where they interact to produce a high-power output 241 with a narrowband spectrum—the interaction in the nonlinear crystal 240 cancels the phase modulation. If the seed beams 211a and 211b are pulsed, and the phase-modulated pulses propagate through minimally dispersive and linear media, they can be converted to lower-wavelength, transform-limited pulses by SHG, SFG, or DFG in the $\chi^{(2)}$ crystal 240. If the seed beams 211a and 211b propagate through dispersive media, then pre-compensation of the phase modulation waveform can ensure that upon arrival at the nonlinear crystal, the shape of the BPSK waveform is maximally square ensuring the 0-$\pi$ portion of the waveform is always at either 0 or $\pi$.

When using two non-degenerate seed beams 211a and 211b, the amplified phase-modulation waveforms that drive the phase modulators 220a and 220b should be aligned in time-ideally, BPSK waveforms should overlap perfectly. (The relative optical phase between non-degenerate seed beams 211a and 211b need not have any particular value.) Time alignment can be achieved by properly time delaying the phase modulation patterns applied to each of the two beams by physical path length differences, or by methods described in U.S. Pre-Grant Publication No. 2021/0351559 A1, entitled "SBS Suppression and Electronic Path Length Matching in Coherent Beam Combining" and filed Mar. 8, 2021. The time alignment can also be discussed in terms of fractional time alignment of the smallest time duration feature of the waveform. In the case of a BPSK waveform, the shortest "bit" of the waveform (a "1" or a "0"), usually has a duration equal to the inverse of the pattern rate. For example, a 1 Gbps BPSK waveform will have a "shortest bit" or "chip" of 1 ns. Reducing conversion efficiency loss due to time misalignment to <1% will require time misalignment of less than 10 ps. Such time alignment precision is readily achieved using RF phase-locking and alignment techniques.

Laser Wavelengths Accessible with the Disclosed Techniques

Figure 3:
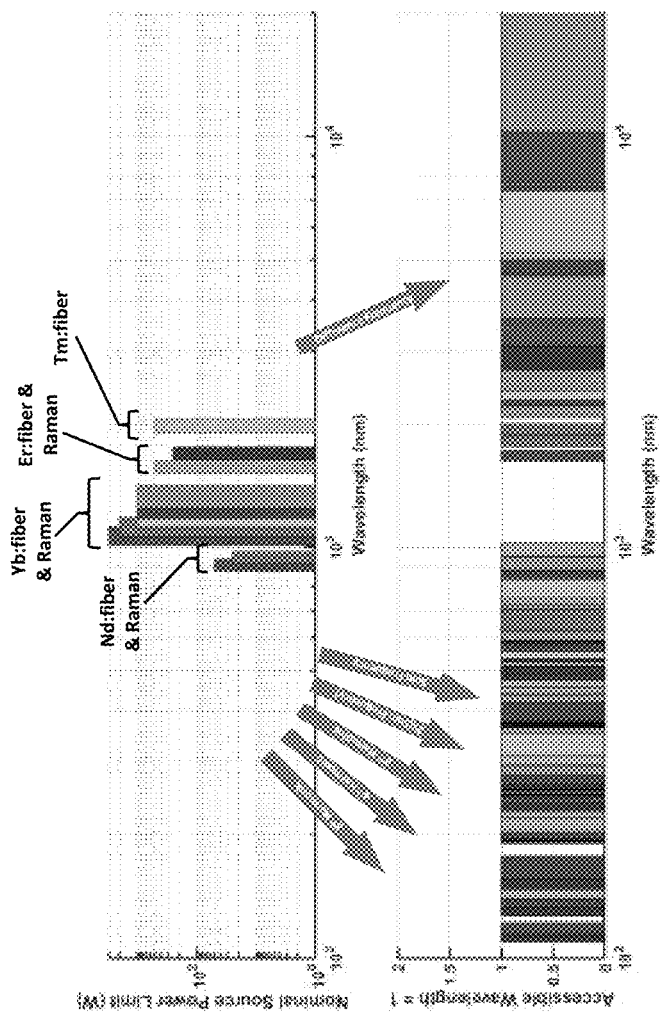
FIG. 3 illustrates nonlinear materials, gain media, wavelengths, and conversion processes suitable for use in the systems shown in FIGS. 1 and 2.

The systems in FIGS. 1 and 2 can be implemented in bulk optics or in fiber optics using a wide range of materials and components, including a wide range of source lasers (e.g., diode lasers, gas lasers, fiber lasers, solid state lasers, etc.). FIG. 3 illustrates a range of fiber laser seed sources and fiber amplifier materials along with output wavelengths for generating narrowband beams at harmonic, sum, or difference frequencies. Generally, optical fiber doped with rare-earth ions, such as neodymium, ytterbium, erbium, or thulium can be used to convert phase-modulated seed beams at wavelengths from about 850 nm to about 1150 nm into narrowband beams at wavelengths from about 100 nm to about 1000 nm using harmonic generation or SFG. An even larger range of wavelengths is accessible by using Raman amplification of wavelengths outside of wavelengths which use the atomic gain of the materials listed immediately above. Shorter wavelengths (higher frequencies) can be reached by generating higher-order even harmonics, such as the fourth, sixth, and eighth harmonics shown in FIG. 3. These optical fibers can also be used to convert phase-modulated seed beams at wavelengths from about 850 nm to about 1150 nm into narrowband beams at wavelengths from about 1050 nm to about 20 um using DFG.

Higher-order conversion processes have an additional linewidth narrowing advantage. As discussed below, the 0-$\pi$ RF waveforms used for phase modulation generally are not exactly 0-T. The spectrum after the first SHG, SFG, or DFG process will contain residual elements of the input BPSK phase modulation waveform. To ensure high-efficiency nonlinear wavelength conversion, the $\chi^{(2)}$ process should have a wide phase-matching bandwidth, e.g., non-critically phase matching (NCPM). NCPM can have phase-matching bandwidths of several hundred GHZ.

In a second nonlinear conversion process, for example, to access 266 nm after SHG of a Yb laser operating at 1064 nm, a narrow phase-matching bandwidth can be employed, limited only by the bandwidth of the original seed laser. The benefit of the narrow phase-matching bandwidth of the second nonlinear process is any unsuppressed BPSK spectral components in the 532 nm optical spectrum are not converted to the fourth-harmonic wavelength, robustly leaving only the converted carrier at the output. Restrictions on the length of any enhancement cavity (discussed above) are also not applicable due to the very low amount of power contained in the residual sidebands.

BPSK Phase Modulation and Phase Modulation Cancellation in a Nonlinear Crystal

To see how a second-order nonlinear crystal cancels binary 0/$\pi$ phase modulation, consider the details of the SHG process for an electric field of amplitude $E_0$, frequency $\omega$, and phase $\phi$:

$$E(t) = E_0 e^{-i[\omega t + \phi(t)]} + c.c.$$

Directing that wave into a $\chi^{(2)}$ medium (e.g., the $\chi^{(2)}$ media 140 and 240 in FIGS. 1 and 2, respectively) induces a polarization in the $\chi^{(2)}$ medium, which itself emits a wave at twice the input frequency (e.g., the second-harmonic beam 141 in FIG. 1), assuming optical wave velocity-matching conditions are met for the fundamental and second-harmonic waves. The amplitude of this conversion process is described by an expression similar to the one below, which uses the effective material susceptibility $d_{eff}$ and the amplitude of the input wave at the fundamental frequency:

$$P(2\omega) = 2d_{eff} E_0(\omega)^2 P(2\omega) = 2d_{eff} E_0(\omega)^2$$

In the equation immediately above, the field of the input beam is squared, which doubles any phase modulation applied to the beam. After the squaring process, that series of 0 and $\pi$ phase shifts becomes a series of 0 and $2\pi$ phase shifts; since both 0 and $2\pi$ shifts result in a wave with the same phase, the modulation has been removed. In the case of SFG, the phases of the two beams add together, and in the case of DFG, the phases subtract. If the phase modulation is a series of 0 and $\pi$ phase shifts, then they will add to 0 and $2\pi$ phase shifts in SFG and subtract to yield 0 phase shifts in DFG: that is, for SHG, $\phi_{out} = 2\phi_{in}$; for SFG, $\phi_{out} = \phi_1 + \phi_2$; and for DFG, $\phi_{out} = \phi_1 - \phi_2$.

FIG. 4 illustrates the effect of Eq. (1.2) on a seed beam that is modulated with 0 and $\pi$ phase shifts and frequency-doubled using a $\chi^{(2)}$ crystal. On the left side of FIG. 4, a PRBS-modulated wave representing the beam's electric field is introduced at x=0 to the $\chi^{(2)}$ crystal, which performs a squaring operation. Notice the periodic phase shifts in the input wave; these shifts create the broad bandwidth of the input spectrum that suppresses SBS in a high-power fiber amplifier. Now notice that the second-harmonic wave at the output of the $\chi^{(2)}$ crystal does not have any discrete phase shifts. (The second-harmonic wave is depicted as a squared version of the input wave with a smaller amplitude.) The second-harmonic wave's spectrum is therefore much narrower, taking on the properties of the seed laser output before modulation. The SHG example in FIG. 4 demonstrates a process that can be used with a 1.5 kW amplifier, 1 μm wavelength fiber amplifier to create a >750 W beam with <kHz-class linewidth at 532 nm.

For SFG and DFG, the same type of result is possible. In the case of SFG and DFG, the phase shifts of the input beams add. In the case of DFG, the phases of the two waves subtract. As a result, for SFG and DFG, there are phase-modulation waveforms besides PRBS and BPSK that can be used to recover a narrowband output. These phase-modulation waveforms can be selected based on the on the desired phase modulation of the output beam (e.g., no phase modulation) and the relationship between phase shifts applied to the input beams and resulting relative phases of the output beam.

For instance, this phase manipulation could be implemented with non-degenerate beams phase modulated by sawtooth or sine waves with equal amplitudes and opposite signs (i.e., one wave rises with time while the other falls). Sine wave, sawtooth, parabolic waveforms, or other arbitrary waveforms are all subject to the input-to-output phase relationship and opportunity for cancellation described in Eq. (1.2). Performing SFG with such phase-modulated beams cancels the phase modulation from the output beam.

Arbitrary input and output phase patterns can be generated with this understanding of the relative phase relationships using this approach. For example, it is also possible to apply more complex phase shifts to the input (seed laser) beams to create other phase shifts in the output beam.

Analysis of Phase Modulation Errors

The precision of the amplitudes of the 0-π phase shifts in the phase modulation applied to the seed beams can affect the linewidth of the output beam from the nonlinear crystal. Similarly, the time alignments of waveforms applied to nondegenerate seed beams can also affect the linewidth of the output beam from the nonlinear crystal. The spectrum of light emitted by the nonlinear crystal takes on the spectral properties of the seed laser in the limit that the phase shifts transition instantly between 0 and π-phase (i.e., the rise and fall times of the phase modulation should be instantaneous). The fraction of time that the phase modulation is not at 0 or π phase can result in some fraction of the converted light shifted out of the carrier. For example, assume the input wave has a square-wave phase modulation amplitude of π+δ, where δ represents a small error. The output beam is essentially phase modulated with the same waveform as the input wave was, but at an amplitude of $2(\pi+\delta)=2\pi+2\delta=2\delta$. The tolerable level of residual phase modulation may be different for each application.

FIGS. 5A-5D illustrate the effects of error in the phase modulation applied to the seed beam. FIG. 5A is a notional time-domain plot of the carrier wave of a second-harmonic beam generated from a seed beam modulated with a PRBS phase modulation amplitude of π+δ, where δ is the phase error. The output beam is phase modulated with the same PRBS phase modulation, but at an amplitude of 2δ. FIG. 5B is a plot of the close-in spectrum of the second-harmonic output showing the suppression of the PRBS sidebands. In this case, the phase error is small enough that the mean suppression of the PRBS spectrum sidebands was about 20 dB. FIG. 5C is plot showing the phase error inferred from the PRBS spectrum sidebands in FIG. 8B. In this case, the 20 dB level of suppression and the length of the PRBS pattern correspond to a root-mean-square (RMS) phase shift error over the length of the PRBS pattern of about 0.7 radians at the SHG wavelength or about 0.35 Radians at the fundamental (seed beam) frequency. FIG. 5D is a plot of the recovered carrier power versus the phase shift error in the PRBS pattern. An error of 0.7 radians corresponds to about 60% of the power in the SHG carrier, which is in good agreement with the measurements discussed above. These estimates are arrived at by mapping the Marechal approximation for spatial phase errors across a beam to temporal errors in the phase modulation applied to seed laser beams used in this disclosure.

Applications

The present technology can be used for a wide variety of applications, including:

Communications Systems

Communications systems are often power limited by stimulated Brillouin scattering (SBS) either in the laser system that creates the light or in the optical fiber that distributes it. Deterministically broadening the laser light prior to transmission over a fiber can significantly extend the allowable transport distance prior to frequency conversion and use of the narrowband result. Extending the power available from continuous-wave (CW) sources also benefits free-space optical communication systems operating over long distances, e.g., to small space terminals, and/or in challenging atmospheric conditions. Please see above for a discussion of possible modulation formats and motivations for operation of a communication system at alternative wavelengths.

Light Sources for Lithography, Semiconductor Inspection, and Fiber Bragg Gratings Current vacuum ultraviolet (UV) light sources emit about 90 W of light at a wavelength of 193 nm with a bandwidth of 0.5 pm or 50 W at a wavelength of 248 pm and a bandwidth of 0.35 pm. Typically, these light sources are lamps or excimer lasers; both have poor electrical efficiency and are complex or dangerous to operate.

Similar optical powers could be generated by a sequence of nonlinear optics steps starting with a commercial off-the-shelf (COTS) 1.5-2.0 KW fiber laser. Typically, the spectrum of such a fiber laser is much too broad for lithography. Modulating and frequency-doubling the laser beam as described above could produce an output whose optical spectrum is an order of magnitude narrower than the spectra of current sources. Owing to the very high average power from the fiber amplifier, such a system would be much simpler to build and operate than existing systems. Further, the electrical efficiency of such a light source could also be much higher, reducing the operating costs.

Laser Guide Star

Today, the highest-power, commercially available guide star laser operates at about 20 W output power and 5 MHz linewidth. This laser is based on a narrowband Raman fiber laser operating at 1178 nm. The Raman fiber laser's output power is limited by SBS on account of the narrow linewidth required to excited sodium in the upper atmosphere. Lifting the bandwidth restriction in the Raman amplifier by phase-modulating the seed beam a PRBS or other 0/π phase modulation could allow dramatic increases in power and corresponding increases in laser guide star power. This extra power could be used to increase star brightness or to create multiple guide stars from the same source to increase the size of the telescope's field of view benefitting from the adaptive optics system. Another benefit of a guide star system based on a fiber laser is the decreased complexity and increased reliability of such a system as compared to a system based on free space optics.

Similarly, narrowband UV laser sources could be supplanted by much higher power lasers using the present technology.

Doppler Wind Lidar and Other Coherent Laser Sensing Systems

Doppler wind lidar and other coherent laser sensing systems are often power limited by SBS, either in the laser system that generates the light or in the fiber system that distributes it. Deterministically broadening the laser light with $0/\pi$ binary phase modulation prior to transmission over a fiber could significantly extend the optical power or allowable transport distance prior to frequency conversion and use of the narrowband result.

Current Doppler wind lidar systems are used for monitoring and optimizing wind turbine operation. The present technology could potentially benefit these applications by making it possible to generate several beams simultaneously from one source. This can be accomplished by splitting a free-space beam or by distributing a beam to a remote transmitter head where the light is converted from the broadband spectrum that can safely traverse the fiber without suffering SBS to the narrowband spectrum used for Doppler measurements.

Detailed Measurements of Narrowband Visible Beams Generated with SHG

FIG. 6 illustrates a Mach-Zehnder interferometer system 600 that can be used to measure the linewidth of a narrowband, visible beam. This narrowband, visible beam is the second harmonic of a portion of a seed beam modulated with binary $0/\pi$ phase modulation as described above. Frequency-shifting and frequency-doubling another portion of the seed beam and interfering both portions at the interferometer output creates an intensity variation at the difference frequency between the two portions. The binary $0/\pi$ phase modulation broadens the spectrum of the corresponding second-harmonic beam, and the temporal intensity pattern which results from interfering the two beams.

The Mach-Zehnder interferometer system 600 includes a seed laser 610 that generates a seed beam at a wavelength of 1064 nm with a 10 mW power level and a 10 kHz linewidth. A beam splitter 612 coupled to the output of the seed laser 610 splits the seed beam into two portions and directs the first portion to a phase modulator 620 and the second portion to an acousto-optic modulator 626. The phase modulator 620 modulates the phase of the first portion with a binary phase modulation from a signal generator 622 that oscillates between 0 and $\pi$ (e.g., a 200 Hz square wave or a 16 Gbps PRBS). The acousto-optic modulator 626 is driven by another signal generator 628 and shifts the frequency of the second portion (e.g., by 10 kHz or 100 MHZ) with respect to the first portion.

Fiber amplifiers 630 and 636 amplify the first and second portions, respectively, to levels of up to tens of milliwatts to kilowatts. Lenses focus the amplified first and second portions into first and second $\chi^{(2)}$ crystals 640 and 646 (e.g., periodically poled (PP) KTP or LBO crystals), respectively, which frequency-double the input beams to produce second harmonic output beams at wavelengths of about 532 nm. Because the second portion is frequency-shifted with respect to the first portion, its second harmonic is frequency-shifted with respect to the first portion's second harmonic.

Another beam splitter 642 combines the second-harmonic output beams and directs them to a third beam splitter 644, which directs part of the combined second-harmonic output beams to an optical spectrum analyzer 660 and part to a silicon photodiode 670 whose bandwidth is selected based on the signal bandwidth/frequency difference (e.g., 1 MHz or 1 GHZ). The silicon photodiode 670 is coupled to a radio-frequency (RF) spectrum analyzer 672. The optical spectrum analyzer 660 measures the spectra of the second harmonic beams and the RF spectrum analyzer 672 measures the spectrum of the beat between the second harmonic beams.

FIGS. 7A-7C and 8A-8C are plots of measurements made using the Mach-Zehnder interferometer system 500 of FIG. 6 for low- and high-power seed beams, respectively. FIGS. 7A-7C were acquired with the RF spectrum analyzer 672, and FIGS. 8A-8C were acquired with the optical spectrum analyzer 660.

FIGS. 7A and 8A are spectra of the seed beams at different frequency and spectral density scales, with the frequency scale indicating the shift from the seed beam wavelength of 1064 nm. FIGS. 7B and 8B are spectra of the seed beams phase-modulated with a 200 Hz square wave and a 16 Gbps PRBS, respectively, both of which oscillate between 0 and $\pi$. In both cases, the phase modulation broadens the seed beam's spectrum—the square-wave phase modulation produces Fourier tones in FIG. 7B and the PRBS phase modulation produces a $sinc^2$ shape in FIG. 8B. FIGS. 7C and 8C show spectra of the second harmonics of the beams in FIGS. 7B and 8B, respectively, with the frequency scale indicating the shift from the nominal second-harmonic wavelength of 532 nm. SHG in the second-order nonlinear crystal completely removes the phase modulation and the original spectra are recovered almost perfectly.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein.

The foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method comprising:
    modulating a phase of a seed beam at an input wavelength with a phase modulation alternating between phase shifts of 0 and $\pi$;
    amplifying the seed beam with a fiber amplifier; and
    interacting the seed beam with a second-order nonlinear medium to generate an output beam at an output wavelength different than the input wavelength, the second-order nonlinear medium canceling the phase modulation from the output beam.

2. The method of claim 1, wherein the phase modulation is a pseudo-random binary sequence.

3. The method of claim 1, wherein the input wavelength is from 970 nm to 2100 nm and the output wavelength is from 485 nm to 1050 nm.

4. The method of claim 1, wherein amplifying the seed beam with the fiber amplifier comprises amplifying the seed beam to a power level of at least 300 mW in a single-mode fiber.

5. The method of claim 1, wherein amplifying the seed beam with the fiber amplifier comprises amplifying the seed beam to a power level of at least 30 W in a few-moded optical fiber.

6. The method of claim 5, further comprising:
    transmitting the seed beam from the fiber amplifier to the second-order nonlinear medium via an optical fiber longer than 1 meter.

7. The method of claim 1, wherein interacting the seed beam with the second-order nonlinear medium comprises generating the output beam as a second harmonic of the seed beam.

8. The method of claim 1, wherein the seed beam is a first seed beam, and further comprising:
    modulating a phase of a second seed beam with the phase modulation; and
    amplifying the second seed beam,
    wherein interacting the first seed beam with the second-order nonlinear medium comprises interacting the first seed beam and the second seed beam in the second-order nonlinear medium.

9. The method of claim 8, wherein interacting the first seed beam and the second seed beam in the second-order nonlinear medium comprises generating the output beam at a carrier frequency equal to a sum of a carrier frequency of the first seed beam and a carrier frequency of the second seed beam.

10. The method of claim 8, wherein interacting the first seed beam and the second seed beam in the second-order nonlinear medium comprises generating the output beam at a carrier frequency equal to a difference of a carrier frequency of the first seed beam and a carrier frequency of the second seed beam.

11. The method of claim 8, further comprising:
    aligning the phase modulation applied to the first seed beam in time with the phase modulation applied to the second seed beam.

12. The method of claim 1, further comprising:
    modulating the seed beam with a communications signal in addition to the phase modulation.

13. A system comprising:
    a seed laser to generate a seed beam at an input wavelength;

a phase modulator, in optical communication with the seed laser, to modulate a phase of the seed beam with a phase modulation alternating between phase shifts of 0 and $\pi$;

an optical amplifier, in optical communication with the phase modulator, to amplify the seed beam; and a second-order nonlinear medium, in optical communication with the optical amplifier, to generate an output beam at an output wavelength different than the input wavelength via a second-order nonlinear interaction, the second-order nonlinear interaction canceling the phase modulation.

14. The system of claim 13, wherein the phase modulation is a pseudo-random binary sequence.

15. The system of claim 13, wherein the input wavelength is from 970 nm to 2100 nm and the output wavelength is from 485 nm to 1050 nm.

16. The system of claim 13, wherein the optical amplifier is configured to amplify the seed beam to a power level of at least 1 kW.

17. The system of claim 13, wherein the second-order nonlinear medium is configured to generate the output beam as a second harmonic of the seed beam.

18. The system of claim 13, wherein the seed laser is a first seed laser, the seed beam is a first seed beam, the optical amplifier is a first optical amplifier, the phase modulator is a first phase modulator, and the optical amplifier is a first optical amplifier, and further comprising:

a second seed laser to generate a second seed beam;

a second phase modulator, in optical communication with the second seed laser, to modulate a phase of the second seed beam with the phase modulation; and a second optical amplifier, in optical communication with the second phase modulator and the second-order nonlinear medium, to amplify the second seed beam, wherein the second-order nonlinear interaction is between the first seed beam and the second seed beam.

19. The system of claim 13, wherein the second-order nonlinear medium is disposed in an enhancement cavity having a cavity length based on a repeat time of the phase modulation.

20. The system of claim 13, further comprising:

an amplitude modulator, in optical communication with the seed laser and/or the phase modulator, to modulate the seed beam with a communications signal.

* * * * *